United States Patent
Kwon et al.

(10) Patent No.: US 9,697,127 B2
(45) Date of Patent: Jul. 4, 2017

(54) SEMICONDUCTOR DEVICE FOR CONTROLLING PREFETCH OPERATION

(71) Applicant: SK hynix Inc., Icheon-si, Gyeonggi-do (KR)

(72) Inventors: Jung-Hyun Kwon, Seoul (KR); Min-Sung Kang, Seoul (KR)

(73) Assignee: SK hynix Inc., Icheon-si (KR)

( * ) Notice: Subject to any disclaimer, the term of this patent is extended or adjusted under 35 U.S.C. 154(b) by 154 days.

(21) Appl. No.: 14/300,413

(22) Filed: Jun. 10, 2014

(65) Prior Publication Data
US 2014/0379995 A1 Dec. 25, 2014

(30) Foreign Application Priority Data
Jun. 19, 2013 (KR) .................. 10-2013-0070033

(51) Int. Cl.
*G06F 12/0862* (2016.01)
(52) U.S. Cl.
CPC .. *G06F 12/0862* (2013.01); *G06F 2212/6022* (2013.01); *G06F 2212/6024* (2013.01); *G06F 2212/6026* (2013.01)
(58) Field of Classification Search
None
See application file for complete search history.

(56) References Cited

U.S. PATENT DOCUMENTS

| | | | | |
|---|---|---|---|---|
| 5,941,981 A * | 8/1999 | Tran | .............. | G06F 9/383 |
| | | | | 711/137 |
| 6,571,318 B1 * | 5/2003 | Sander | .............. | G06F 12/0862 |
| | | | | 711/137 |
| 8,347,037 B2 * | 1/2013 | Guthrie | .............. | G06F 12/0897 |
| | | | | 711/122 |
| 2004/0006671 A1 * | 1/2004 | Handgen | .............. | G06F 13/161 |
| | | | | 711/137 |
| 2008/0016330 A1 | 1/2008 | El-Essawy et al. | | |
| 2008/0104327 A1 * | 5/2008 | Duncan | .............. | G06F 12/0862 |
| | | | | 711/137 |
| 2008/0133877 A1 | 6/2008 | Chai et al. | | |
| 2014/0006718 A1 * | 1/2014 | Ramani-Augustin | .............. | G06F 12/0862 |
| | | | | 711/137 |
| 2015/0143057 A1 * | 5/2015 | Pavlou | .............. | G06F 12/02 |
| | | | | 711/137 |

FOREIGN PATENT DOCUMENTS

KR 1020057010495 A 6/2005

* cited by examiner

*Primary Examiner* — Jared Rutz
*Assistant Examiner* — Charles Choi
(74) *Attorney, Agent, or Firm* — William Park & Associates Ltd.

(57) ABSTRACT

A semiconductor device may include a pattern detector configured to select any one of a plurality of stride patterns as a detect pattern by referring to an input address, and the pattern detector may be configured to generate a prefetch address. The semiconductor device may also include a prefetch controller configured to generate a prefetch request according to the prefetch address generated by the pattern detector. The semiconductor device may also include a first storage unit configured to store prefetch data provided from a memory device according to the prefetch request generated by the prefetch controller, and a second storage unit configured to store prefetch data removed from the first storage unit.

16 Claims, 7 Drawing Sheets

SEMICONDUCTOR DEVICE FOR CONTROLLING PREFETCH OPERATION

CROSS-REFERENCE TO RELATED APPLICATIONS

The present application claims priority of Korean Patent Application No. 10-2013-0070033, filed on Jun. 19, 2013, which is incorporated herein by reference in its entirety.

BACKGROUND

1. Technical Field

Various embodiments generally relate to a semiconductor device, and more particularly, to a semiconductor device for controlling a prefetch operation for a memory device.

2. Related Art

Until a read request for a memory device is completed, a processor may wait for a response from the memory device. Thus, rapidly processing a read request may improve the performance of a system.

One way to rapidly process a read request is to use a prefetch method which uses previously read data from an address of a memory device, which is expected to be requested. However, when the address prediction is not accurately performed, unnecessary prefetch operations may be increased thereby reducing the performance of the system.

The conventional prefetch method may not accurately predict a prefetch address because of, for example, varying patterns of the addresses associated with the read requests of the memory devices. Further complicating the process of a processor are prefetch operations that reference a program counter and an address of the memory device that must be transmitted to a memory controller.

SUMMARY

In an embodiment, a semiconductor device may include a pattern detector configured to select any one of a plurality of stride patterns as a detect pattern by referring to an input address, and the pattern detector configured to generate a prefetch address. The semiconductor device may also include a prefetch controller configured to generate a prefetch request according to the prefetch address generated by the pattern detector, and a first storage unit configured to store prefetch data provided from a memory device according to the prefetch request generated by the prefetch controller. Also, the semiconductor device may include a second storage unit configured to store prefetch data removed from the first storage unit.

DETAILED DESCRIPTION

Figure 1:
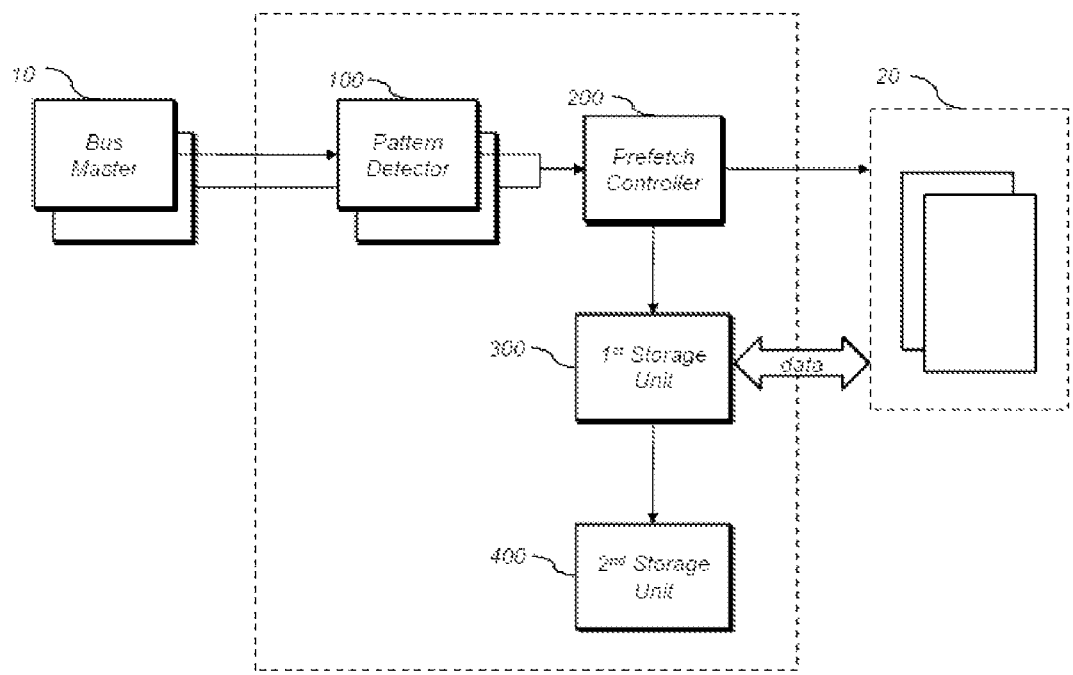
FIG. 1 is a block diagram representation of a semiconductor device in accordance with an embodiment of the present invention.

The various embodiments described below may be embodied in different forms and should not be construed as limited to the embodiments set forth herein. Rather, these embodiments are provided so that this disclosure will be thorough and complete, and will fully convey the scope of the application to those skilled in the art. Throughout the disclosure, like reference numerals refer to like parts throughout the various figures and embodiments.

FIG. 1 is a representation of a block diagram of a semiconductor device in accordance with an embodiment The semiconductor device in accordance with an embodiment may include a pattern detector 100, and a prefetch controller 200. The semiconductor device may also include a first storage unit 300, and a second storage unit 400. The pattern detector 100 may select any one of a plurality of stride patterns by referring to an input address, and generate a prefetch address. The prefetch controller 200 may generate a prefetch request for the generated prefetch address. The first storage unit 300 may store data prefetched from the memory device 20 in connection with the prefetch address. The second storage unit 400 may store data removed from the first storage unit 300.

When read requests are made from a bus master 10, the pattern detector 100 may continuously detect addresses for the read requests (hereafter, referred to as input addresses), and detect a stride pattern formed by the input addresses. When a detect pattern is selected, the pattern detector 100 may generate a prefetch address using a current input address and the selected detect pattern.

The bus master 10 may be used as a device for inputting data to the memory device. The bus master 10 may be used as a device for outputting data from the memory device. The bus master 10 may include a processor core and a direct memory access DMA device. Depending on the embodiments, one, two, or more bus masters 10 may be coupled to the pattern detector(s) 100. When two or more bus masters 10 are provided, the bus masters 10 may have IDs to distinguish one another a part from each other. For example, in a system using a dual-core processor, the bus masters 10 may be divided into a bus master 0 and a bus master 1 which have different IDs from each other.

When two or more bus masters 10 are provided, two or more pattern detectors 100 may be provided to correspond to the respective bust masters 10. For example, in the above-described system using a dual-core processor, the pattern detectors 100 may be divided into a pattern detector 0 corresponding to the bus master 0 and a pattern detector 1 corresponding to the bus master 1.

In these cases, the pattern detector 0 may detect a stride pattern for addresses inputted from the bust master 0, and the pattern detector 1 may detect a stride pattern for addresses inputted from the bus master 1. As such, for example, the pattern detector 0 and the pattern detector 1 may have substantially the same configurations.

Stride may be defined as an interval between two input addresses. Hereafter, when two input addresses are provided successively, it may be represented by phase 1, when another input address is provided between two input addresses, it may be represented by phase 2, and when (N−1) input addresses are provided between two input addresses, it may be represented by phase 3, where N is a natural number.

In an embodiment, the pattern detector 100 may detect a stride pattern for two or more phases. The operation of the pattern detector will be described in more detail below with reference to FIGS. 2 and 3.

When prefetch addresses are provided from the one, two, or more pattern detectors 100, the prefetch controller 200 may generate corresponding prefetch requests. The prefetch addresses provided from the pattern detectors 100 may be distinguished from each other in accordance with the IDs of the bus masters 10.

The prefetch request may be arbitrarily provided to the memory device 10 at any time. However, in order to possibly prevent performance degradation the prefetch request may be provided when the memory device 20 is in an idle state.

Referring to FIG. 1, the first storage unit 300 may store data outputted from the memory 20 (hereafter, referred to as prefetch data) according to a prefetch request. The first storage unit 300 may store the prefetch data in connection with a prefetch address. When a plurality of bus masters 10 are provided, the first storage unit 300 may distinguish prefetch addresses from each other, according to the IDs of the bus masters 10.

The second storage unit 400 may store data that has been removed from the first storage unit 300. Additionally, the second storage unit 400 may store the removed data in connection with an address corresponding to the removed data. When a plurality of bus masters 10 are provided, the second storage unit 400 may distinguish addresses of the removed data from each other, according to the IDs of the bus masters 10.

Hereafter, in an embodiment where data is removed from the first storage unit 300 will be described below.

When a new read request is inputted from the bus master 10, the semiconductor device may search the first and second storage units 300 and 400 and determine whether data associated with an input address has been stored. Then, when it has been determined that the data connected with the input address has been stored, the semiconductor device may provide the data to the corresponding bus master 10 without accessing the memory device 20. This in turn may improve reading performance.

Figure 2:
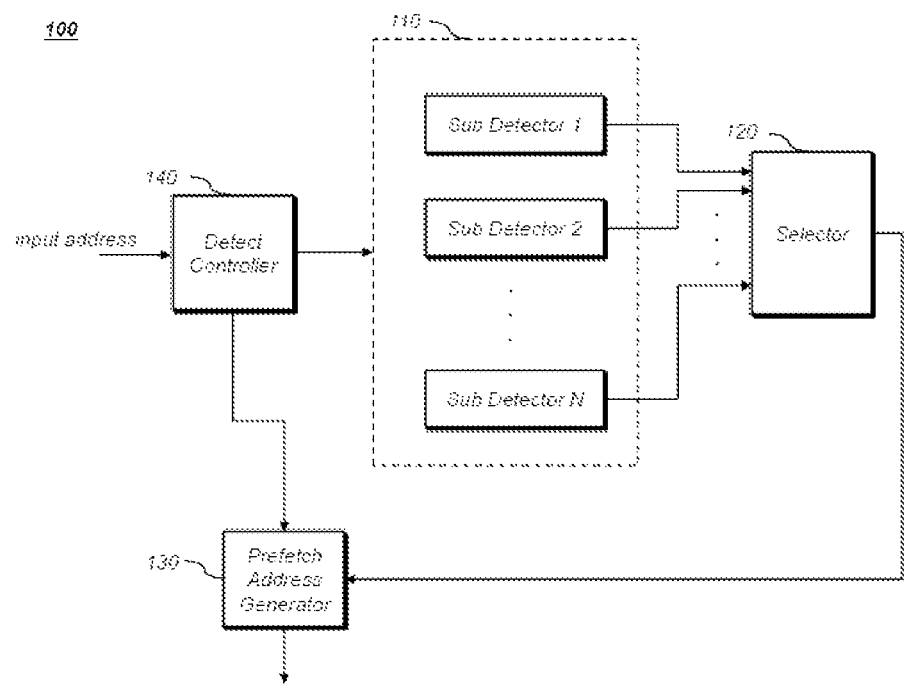
FIG. 2 is a representation of a block diagram illustrating the configuration of a pattern detector of FIG. 1.

FIG. 2 is a representation of a block diagram illustrating the configuration of the pattern detector 100 of FIG. 1.

The pattern detector 100 may include a plurality of sub detectors 110, and a selector 120. The pattern detector 100 may also include a prefetch address generator 130, and a detect controller 140.

Each of the sub detectors 110 may detect any one of a plurality of stride patterns by referring to an input address. For example, a first sub detector may detect a stride pattern for phase 1, a second sub detector may detect a stride pattern for phase 2, and an N-th sub detector may detect a stride pattern for phase N, where N is a natural number greater than zero.

The pattern detector 100 may further include a storage unit (not illustrated) configured to store a detect count at each of the sub detectors 110. In these cases, the sub detector 110 may accumulate the detect count when detecting a corresponding stride pattern.

In an embodiment, even when the sub detector 110 detects a corresponding stride pattern, the stride pattern may be selected as a detect pattern only in the case where the detect count exceeds a threshold value. Additionally, the threshold value may be set differently for each of the sub detectors 110.

The detailed configuration and detection operation of the sub detector 110 will be described below with reference to FIG. 3.

Referring to FIG. 2, the selector 120 may select any one of the one, two, or more sub detectors 110 which are determined to have detected corresponding stride patterns, and select a stride pattern corresponding to the selected sub detector 110 as a detect pattern.

In an embodiment, the selector 120 may compare a detect count for each stride pattern to a threshold value, and select a detect pattern. For example, the selector 120 may select a detect pattern only when the detect count exceeds the threshold value. When there exists a plurality of sub detectors 110 having a detect count more than the threshold value, the selector 120 may select a stride pattern, corresponding to the sub detector 10 having the largest detect count, as a detect pattern. The method in which the selector 120 selects any one stride pattern may be modified in various manners by those skilled in the art, depending on the embodiments.

By combining the input address and the selected stride pattern, the prefetch address generator 130 may generate a prefetch address. When no stride pattern is selected, the prefetch address generator 130 does not generate a prefetch address. In these cases, the prefetch address generator 130 may output a signal indicating that a prefetch operation is not needed.

The detect controller 140 may determine whether an input address provided from outside is matched with a previously generated prefetch address.

When the two addresses match with each other or the two addresses successfully match with each other, the detect controller 120 may provide the input address to the plurality of sub detectors 110 to perform a pattern detection operation. According to the result of the pattern detection operation, the selector 120 and the prefetch address generator 130 may operate to update the prefetch address.

When the two addresses do not match with each other or the two addresses fail to match with each other, the detect controller 120 may accumulate a match fail count. For these operations, the pattern controller 100 may further include a storage unit (not illustrated) to store the match fail count.

The detect controller 140 may compare the accumulated match fail count to another threshold value.

When the accumulated match fail count does not exceed the threshold value, the detect controller 140 does not provide the input address to the sub detectors 110. Thus, a detection operation is not performed on the current input address, and the prefetch address generator 130 does not generate a prefetch address. Therefore, the prefetch controller 200 does not generate a prefetch request.

When the accumulated match fail count exceeds the threshold value, the detect controller 120 resets the match fail count, invalidates the detection results of the respective sub detectors 110, and does not generate a prefetch address. In these cases, the prefetch controller 200 does not generate a prefetch request. Furthermore, all prefetch requests which are already generated and not yet executed are removed, and all of the prefetch addresses and the prefetch data of the first storage unit 300 is removed and stored in the second storage unit 400.

Figure 3:
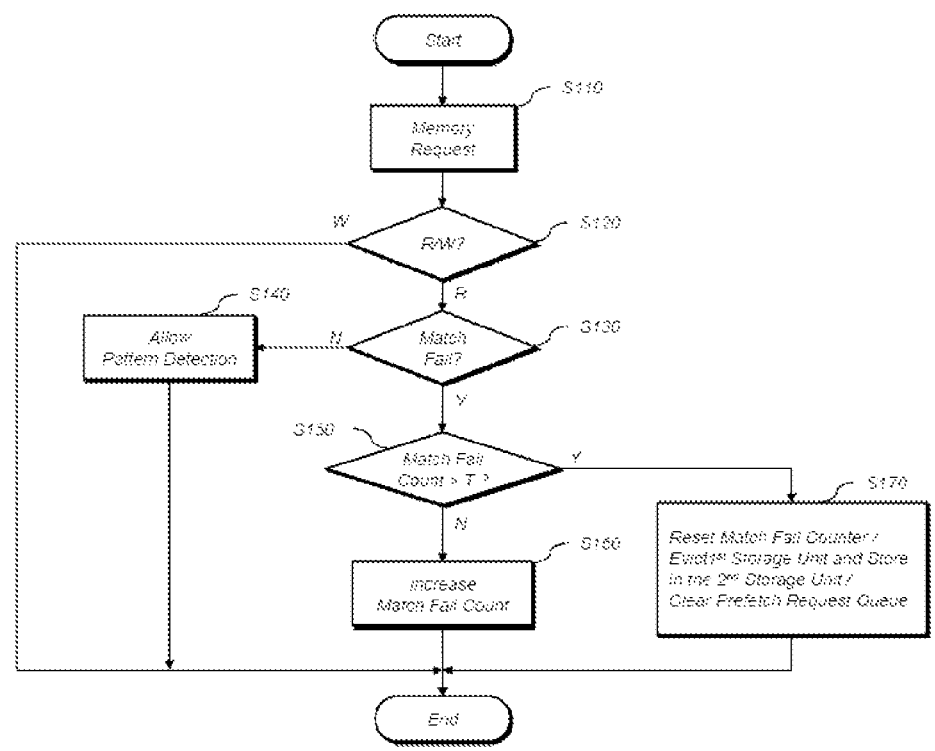
FIG. 3 is a representation of a flowchart illustrating the operation of the pattern detector of FIG. 2.

FIG. 3 is a representation of a flowchart illustrating the operation of the pattern detector 100 of FIG. 2.

Referring now to FIG. 3, first, when a request for the memory device 20 is provided at step S110, the pattern detector 100 may determine whether the request is a read request R or a write request W, at step S120. When the request is not a read request, the process is ended. When the request is a write request W, the process is ended.

When the request is a read request R, the pattern detector 100 determines whether a provided input address matches with a prefetch address which has already been generated and currently maintained, at step S130.

When the addresses are matched with each other or when two addresses successfully match with each other, the pattern detector 100 may provide the input address to the plurality of sub detectors 110. Thus, as illustrated in FIG. 3, when at step S130 there is not a match fail then, as described above, the selector 120 and the prefetch address generator 130 may be operated to select a detect pattern and generate a prefetch address, at step S140 (Allow Pattern Detection).

When at step S130 the addresses are not matched with each other or the two addresses fail to match with each other (matching fail) (i.e., Y), the pattern detector 100 compares an accumulated match fail count to a threshold value at step S150.

When the accumulated match fail count does not exceed a threshold value T or when the accumulated match fail count equals the threshold value T (i.e., N), the pattern detector 110 accumulates the match fail count, but does not provide the input address to the sub detectors 110 at step S160. At this time, the selector 120 maintains the current selected detect pattern, and the prefetch address generator 130 does not generate a prefetch address. Thus, the prefetch controller 200 does not perform a prefetch operation.

When the accumulated match fail count does exceed the threshold value T (i.e., Y), the pattern detector 100 resets the match fail count, and removes prefetch requests which are already generated but not yet executed. Furthermore, all of the detection results of the sub detectors 110 are reset, and all of the prefetch addresses and prefetch data of the first storage unit 300 are removed and stored in the second storage unit 400.

Figure 4:
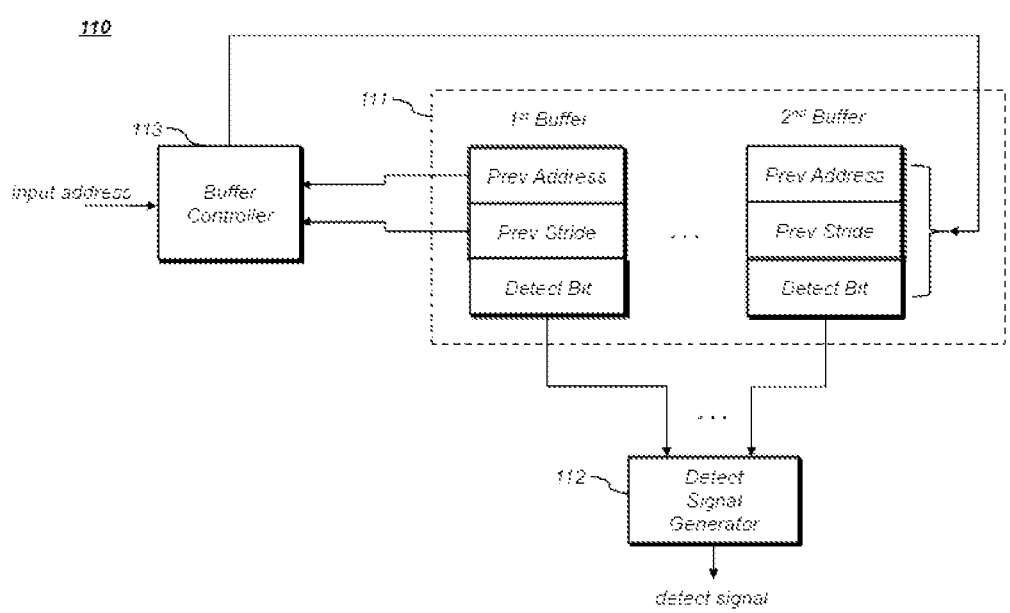
FIG. 4 is a representation of a block diagram illustrating the detailed configuration of a sub detector of FIG. 2.

FIG. 4 is a representation of a block diagram illustrating the detailed configuration of the sub detector 110 of FIG. 2.

The sub detector 110 may include a plurality of buffers 111, and a detect signal generator 112. The sub detector 110 may also include a buffer controller 113.

In an embodiment, the sub detector 110 may serve to detect a stride pattern for phase N, and includes N buffers. The N buffers may include a buffer which has been updated most recently (hereafter, referred to as a first buffer), a buffer which was updated the longest time ago (hereafter, referred to as a second buffer), and may include other buffers which were updated therebetween or between the updating times of the first and second buffers. In an embodiment, N may be a natural number. However, if the sub detector 110 only uses one buffer to detect a stride pattern for phase 1 then the first and second buffers indicate the same buffer.

Each of the N buffers may include a previous address, a previous stride, and detection information. Whenever a new input address is provided, information on the second buffer which was updated the longest time ago is updated with new information. Thus, whenever a new input address is provided, physical buffers indicated by the first and second buffers are continuously changed.

The detect signal generator 112 activates a detect signal when all pieces of information of the N buffers are activated.

When an input address is provided, the buffer controller 113 may obtain a current stride through a difference between the input address and the value of the previous address field of the first buffer. Then, the buffer controller 113 may compare the current stride to the previous stride of the first buffer.

The buffer controller 113 may activate the detect information field of the second buffer when the current stride and the previous stride are equal to each other. The buffer controller 113 may deactivate the detect information field of the second buffer when the current stride and the previous stride are different from each other. Then, the buffer controller 114 may input the current address to the previous address field of the second buffer, and may input the current stride to the previous address field of the second buffer, in order to update the second buffer.

As the detect information or detection information of the second buffer is updated by the operation of the buffer controller 113, the output of the detect signal generator 112 may be changed.

Figure 5:
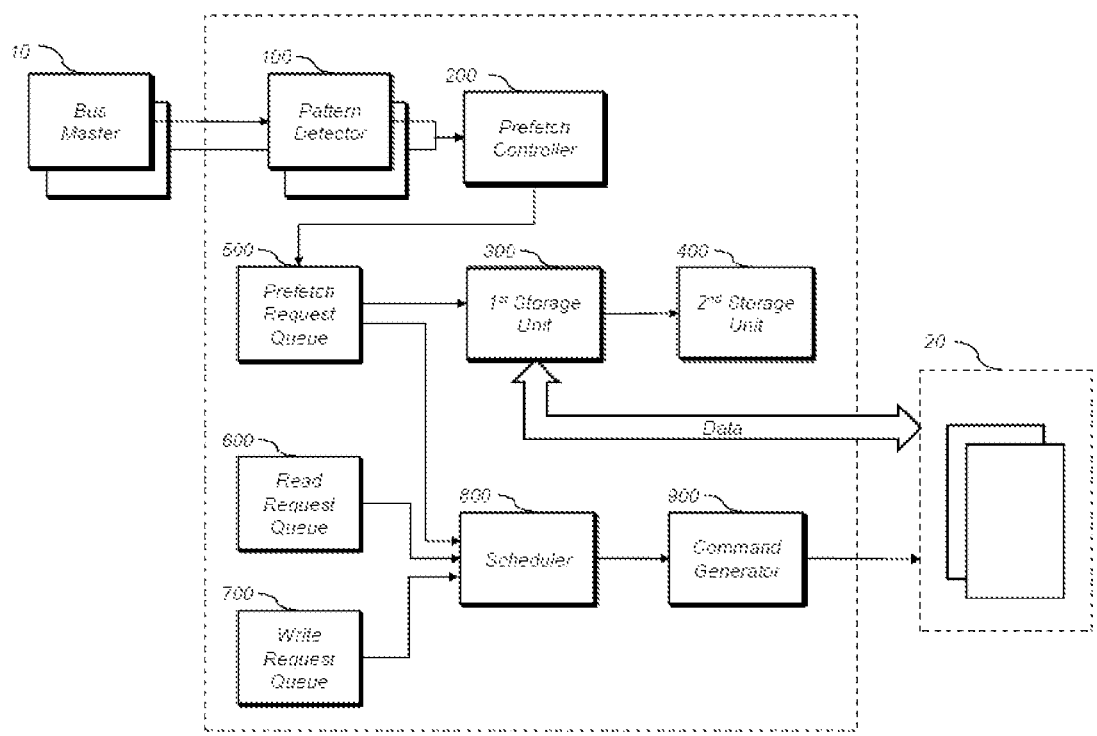
FIG. 5 is a representation of a block diagram illustrating a semiconductor device in accordance with an embodiment.

FIG. 5 is a representation of a block diagram illustrating a semiconductor device in accordance with an embodiment. The semiconductor device in accordance with an embodiment may be implemented with a memory controller or a processor including the same.

Referring to FIG. 5, a semiconductor device may include a prefetch request queue 500, and a read request queue 600. The semiconductor device may also include a write request queue 700, a scheduler 800, and a command generator 900. Additionally, the semiconductor may include the pattern detector 100, the prefetch controller 200, and the first storage unit 300. Also, the semiconductor may include the second storage unit 400. The prefetch request queue 500 may store a prefetch request generated by the prefetch controller 200. The read request queue 600 may store a read request provided from the bus master 10. The write request queue 700 may store a write request provided from the bus master 10. The scheduler 800 may select any one of a plurality of requests stored in the prefetch request queue 500, the read request queue 600, and the write request queue 700. The command generator 900 may generate a command corresponding to the request selected through the scheduler and may provide the generated command to the memory device 20.

The scheduler 800 may be designed in various manners by those skilled in the art, using a variety of scheduling methods. In order to prevent performance degradation, the prefetch requests stored in the prefetch request queue 500 may be preferentially selected when the memory device 20 is in an idle state.

The command generator 900 may generate a command corresponding to the selected request. The command generator 900 may use a method, for generating a command corresponding to the selected request, which is determined according to the type of the memory device 20 or a set of rules. Thus, the detailed descriptions thereof are omitted herein.

Hereafter, the operation of the semiconductor device illustrated in FIG. 5 will be described with reference to FIG. 6.

Figure 6:
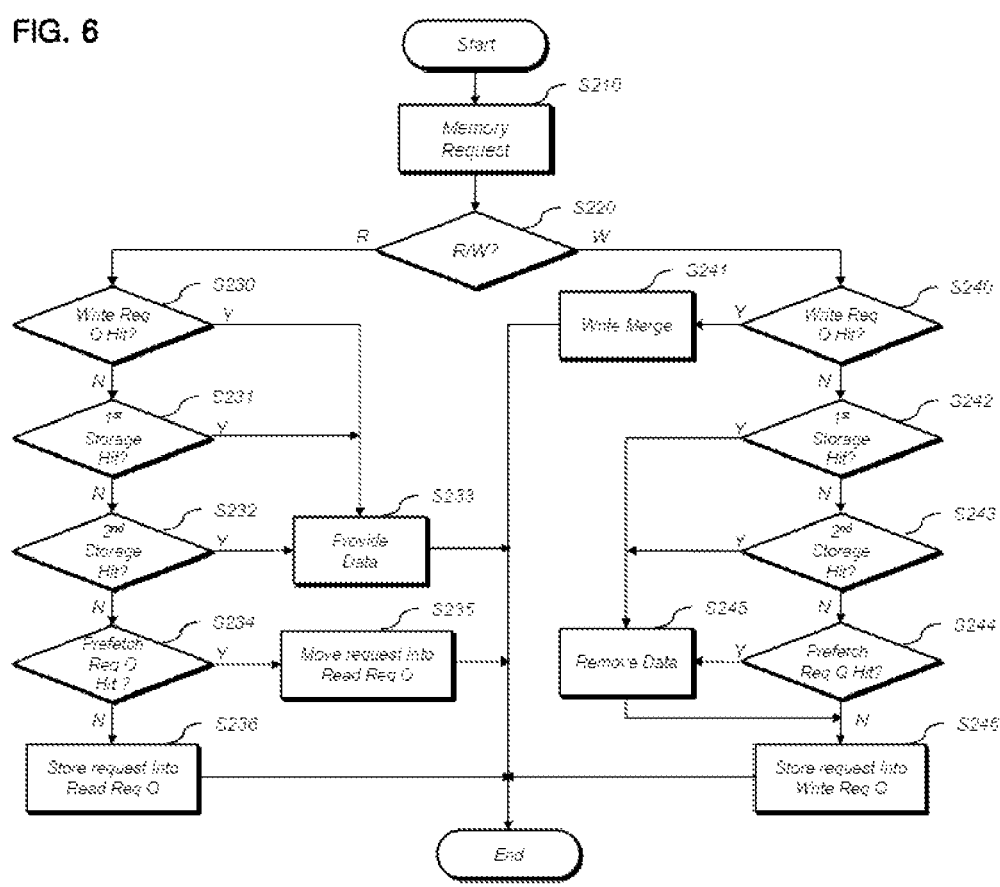
FIG. 6 is a representation of a flowchart illustrating the operation of the semiconductor device of FIG. 5.

FIG. 6 is a representation of a flowchart illustrating the operation of the semiconductor device of FIG. 5.

First, a request for the memory device 20 is received from the bus master 10 at step S210. Then, at step S220, the semiconductor device may determine whether the request is a read request or write request (i.e., R/W).

When the semiconductor device determines that the request is a read request (i.e., R), the semiconductor device then determines whether an address of the read request matches with an address of a write request stored in the write request queue 700. This is performed at step S230 (i.e., Write Req. Q Hit?).

When a read request for the matched address is made, the semiconductor device may provide corresponding data to the bus master 10 at step S233, and then end the process. Otherwise, the semiconductor device may determine whether the address of the read request matches with an address stored in the first storage unit 300, at step S231 (i.e., $1^{st}$ Storage Hit?).

When data exists at the matched address, the semiconductor device may provide the data to the bus master 10 at step S233, and then end the process. Otherwise, the semiconductor device may determine whether the address of the read request matches with an address stored in the second storage unit 400, at step S232 (i.e., $2^{nd}$ Storage Hit?).

When data exists at the matched address, the semiconductor device may provide the data to the bus master 10 at step S233 and then end the process. Otherwise, the semiconductor device may determine whether the address of the read request exists in the prefetch request queue 500 at step S234 (i.e., Prefetch Req Q Hit?).

When a prefetch request for the matched address is made, the semiconductor device may transfer a prefetch request of the prefetch request queue 500 to the read request queue 600 at step S235 and then end the process. Otherwise, the semiconductor device may store the read request in the read request queue 600 at step S236 and then end the process.

When the semiconductor device determines that the request is a write request (i.e., W), the semiconductor device may determine whether an address of the write request matches with an address of a write request stored in the write request queue 700. This is performed at step S240 (i.e., Write Req Q Hit?).

When a write request for the matched address is made, the semiconductor device may update the write request into information of the input write request at step S241 and then end the process. Otherwise, the semiconductor device may determine whether the address of the write address matches with an address stored in the first storage unit 300. This is performed at step S242 (i.e., $1^{st}$ Storage Hit?).

When data exists at the matched address, the semiconductor device may remove corresponding information from the first storage unit 300 at step S245, store the input write request in the write request queue 700 at step S246, and then end the process. Otherwise, the semiconductor device may determine whether the address of the write request matches with an address stored in the second storage unit 400. This is performed at step S243 (i.e., $2^{nd}$ Storage Hit?).

When data exists at the matched address, the semiconductor device may remove the corresponding information from the second storage unit 400 at step S245, store the input write request in the write request queue 700 at step S246, and then end the process. Otherwise, the semiconductor device may determine whether the address of the write request matches with an address stored in the prefetch request queue 700. This is performed at step S244 (i.e., Prefetch Req Q Hit?).

When a prefetch request for the matched address is made, the semiconductor device removes the prefetch request from the prefetch request queue 500 at step S245, stores the input write request in the write request queue 700, and then ends the process. Otherwise, the semiconductor device may store the write request in the write request queue 600 at step S246 and then end the process.

As described above, when a plurality of bus masters 10 are provided, input addresses may be distinguished for the respective IDs of the bus masters 10 so as to detect a stride pattern and prefetch data.

Figure 7:
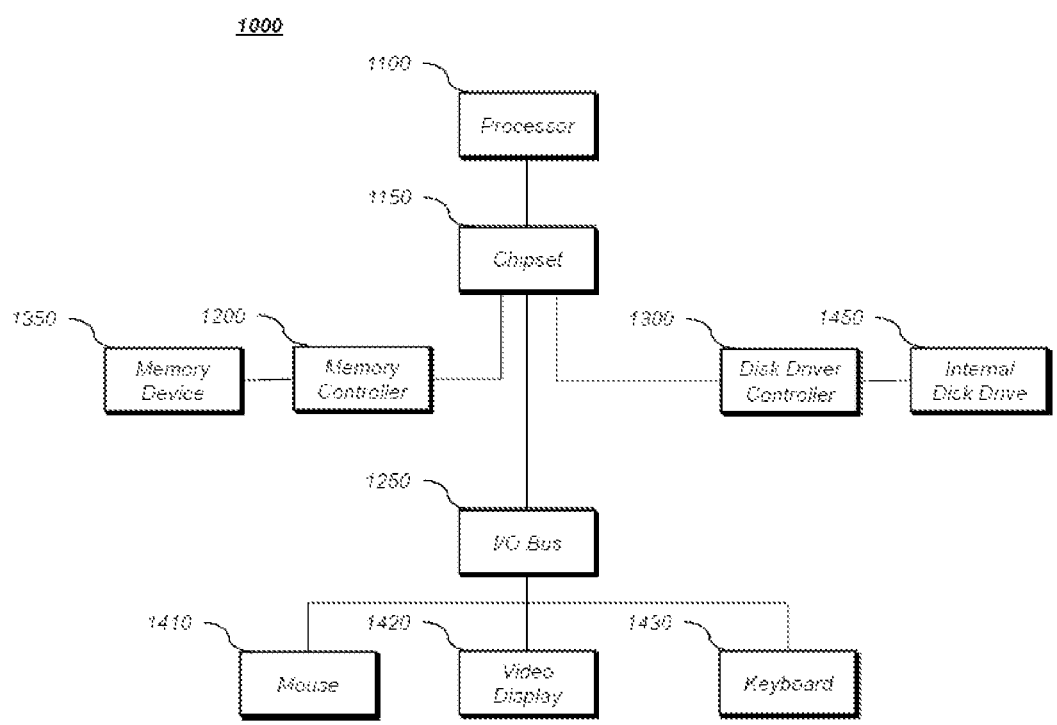
FIG. 7 illustrates a block diagram representation of a system employing the semiconductor device in accordance with the embodiments discussed above with relation to FIGS. 1-6.

The semiconductor device discussed above is particular useful in the design of memory devices, processors, and computer systems. For example, referring to FIG. 7, a block diagram of a system employing the semiconductor device in accordance with the embodiments are illustrated and generally designated by a reference numeral 1000. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented.

A chipset 1150 may be operably coupled to the CPU 1100. The chipset 1150 is a communication pathway for signals between the CPU 1100 and other components of the system 1000, which may include a memory controller 1200, an input/output ("I/O") bus 1250, and a disk drive controller 1300. Depending on the configuration of the system, any one of a number of different signals may be transmitted through the chipset 1150, and those skilled in the art will appreciate that the routing of the signals throughout the system 1000 can be readily adjusted without changing the underlying nature of the system.

As stated above, the memory controller 1200 may be operably coupled to the chipset 1150. The memory controller 1200 may include at least one semiconductor device as discussed above with reference to FIGS. 1-6. Thus, the memory controller 1200 can receive a request provided from the CPU 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the semiconductor device as discussed above with relation to FIGS. 1-6, the memory devices 1350 may include a plurality of word lines and a plurality of bit lines for defining a plurality of memory cell. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. Further, the I/O bus 1250 may be integrated into the chipset 1150.

The disk drive controller 1450 (i.e., internal disk drive) may also be operably coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

It is important to note that the system 1000 described above in relation to FIG. 7 is merely one example of a system employing the semiconductor device as discussed above with relation to FIGS. 1-6. In alternate embodiments, such as cellular phones or digital cameras, the components may differ from the embodiments shown in FIG. 7.

In accordance with the embodiments, a prefetch operation may be simply controlled on the basis of an address of a read request, without using a program counter. Furthermore, any one of various stride patterns may be selected to reduce the possibility that an input address is mismatched with a prefetch address. Furthermore, even when an input address and a prefetch address are temporarily mismatched, prefetched data may not be discarded but reused. Thus, it may be possible to minimize the waste of resource which may occur when the input address and the prefetch address are mismatched.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
   a pattern detector configured to select any one of a plurality of stride patterns as a detect pattern by referring to an input address, and the pattern detector configured to generate a prefetch address;
   a prefetch controller configured to generate a prefetch request according to the prefetch address generated by the pattern detector;
   a first storage unit configured to store prefetch data provided from a memory device according to the prefetch request generated by the prefetch controller; and
   a second storage unit configured to store prefetch data removed from the first storage unit,
   wherein the input address is provided from a bus master,
   wherein the pattern detector refers the input address and a plurality of previous input addresses previously input from the bus master to generate the detect pattern and wherein the pattern detector generates the prefetch address by combing the input address and the detect pattern,
   wherein the pattern detector comprises a plurality of sub detectors configured to detect any one of the plurality of stride patterns by referring to the input address and the plurality of previous input addresses; and a selector configured to select any one of the plurality of stride patterns as the detect pattern by referring to detection results of the plurality of sub detectors,
   wherein each of the plurality of sub detectors comprises:
   one or more buffers, each buffer configured to store information on a previous input address, a previous stride, and a detect bit;
   a buffer controller configured to generate a current stride from the input address and a previous input address of a first buffer which has been updated most recently among the one or more buffers; and
   a detect signal generator configured to indicate detection of the corresponding stride pattern when a detect bit included in each of the one or more buffers is activated, and
   wherein when the current stride is equal to a previous stride of the first buffer, the buffer controller activates a detect bit of a second buffer which has been updated least recently among the one or more buffers, places the current stride to a previous stride field of the second buffer, and places the input address to a previous address field of the second buffer.

2. The semiconductor device of claim 1, wherein when a match fail count, obtained by counting a match fail at which the input address is not matched with the prefetch address, exceeds a first threshold value, the prefetch data of the first storage unit is relocated to the second storage unit, and the match fail count is reset to invalidate the detect pattern.

3. The semiconductor device of claim 2, wherein if the match fail count does not exceed the first threshold value, then the match fail count is increased.

4. The semiconductor device of claim 1, wherein the pattern detector selects a stride pattern as the detect pattern, and
   wherein the selected stride pattern has a detect count that is equal to or more than a second threshold value.

5. The semiconductor device of claim 4, wherein when there exist a plurality of stride patterns each having a detect count equal to or larger than the second threshold value, the pattern detector selects a stride pattern having the largest detect count as the detect pattern.

6. The semiconductor device of claim 5, wherein the second threshold value is set differently for each stride pattern.

7. The semiconductor device of claim 1, wherein the pattern detector further comprises:
   a prefetch address generator configured to generate the prefetch address from the detect pattern and the input address; and
   a detect controller configured to control the input address, the plurality of sub detectors, and the prefetch address generator.

8. The semiconductor device of claim 7, wherein the selector selects a stride pattern as the detect pattern, and
   wherein the stride pattern has a detect count that exceeds a second threshold value.

9. The semiconductor device of claim 8, wherein when there exist a plurality of stride patterns having a detect count more than the second threshold value, the selector selects a stride pattern having the largest detect count as the detect pattern.

10. The semiconductor device of claim 9, wherein the second threshold value is set differently for each of the sub detectors.

11. The semiconductor device of claim 1, further comprising:
    a prefetch request queue configured to store the prefetch request;
    a read request queue configured to store a read request received from outside the semiconductor device;
    a write request queue configured to store a write request received from outside the semiconductor device;
    a scheduler configured to select any one of a plurality of requests stored in the prefetch request queue, the read request queue, and the write request queue; and
    a command generator configured to generate a command to provide to a memory device according to the request selected through the scheduler.

12. The semiconductor device of claim 11, wherein when a read request is received from outside the semiconductor device, the semiconductor device is configured to sequentially search the write request queue, the first storage unit, and the second storage unit, check whether an address of the read request exists, and provide corresponding data when the address of the read request exists.

13. The semiconductor device of claim 12, wherein the semiconductor device is configured to search the prefetch request queue when the address of the read request does not exist, and is configured to transfer a corresponding request of the prefetch request queue to the read request queue when the address of the read request exists.

14. The semiconductor device of claim 11, wherein when a write request is received from outside the semiconductor device, the semiconductor device is configured to search the write request queue, check whether an address of the write request exists, and combine a corresponding request with the write request inputted from outside when the address of the write request exists.

15. The semiconductor device of claim 14, wherein the semiconductor device is configured to sequentially search the first storage unit, the second storage unit, and the prefetch request queue when the address of the write request does not exist in the write request queue, check whether the address of the write request exists, remove corresponding information from the first storage unit, the second storage unit, or the prefetch request queue when the address of the write request exists, and store the write request in the write request queue.

16. The semiconductor device of claim 15, wherein the semiconductor device is configured to store the write request in the write request queue when the address of the write request does not exist in the first storage unit, the second storage unit, and the prefetch request queue.

* * * * *